(12) United States Patent
Gazit et al.

(10) Patent No.: US 10,295,671 B2
(45) Date of Patent: May 21, 2019

(54) ARRAY LIDAR WITH CONTROLLABLE FIELD OF VIEW

(71) Applicant: GM Global Technology Operations LLC, Detroit, MI (US)

(72) Inventors: Ran Y. Gazit, Ra'anana (IL); Ariel Lipson, Tel Aviv (IL); Kobi J. Scheim, Pardess Hanna (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 15/145,929

(22) Filed: May 4, 2016

(65) Prior Publication Data

US 2016/0327636 A1 Nov. 10, 2016

Related U.S. Application Data

(60) Provisional application No. 62/158,288, filed on May 7, 2015.

(51) Int. Cl.
*G01S 17/93* (2006.01)
*G01S 7/481* (2006.01)
*G01S 7/497* (2006.01)

(52) U.S. Cl.
CPC .......... *G01S 17/936* (2013.01); *G01S 7/4815* (2013.01); *G01S 7/4972* (2013.01)

(58) Field of Classification Search
CPC ........ G01S 17/89; G01S 7/4815; G01S 17/10; G01C 3/08; G01C 25/00; G01C 3/32; Y10T 29/49002; Y10T 29/49117
See application file for complete search history.

(56) References Cited

U.S. PATENT DOCUMENTS

| 4,283,113 | A | * | 8/1981 | Eden | G02F 1/19 356/28.5 |
|---|---|---|---|---|---|
| 8,262,252 | B2 | | 9/2012 | Bergman et al. | |
| 8,761,594 | B1 | * | 6/2014 | Gross | H04N 5/2256 396/155 |
| 9,732,942 | B2 | | 8/2017 | Jorgensen | |
| 2008/0285010 | A1 | * | 11/2008 | Shoji | G01S 7/4811 356/5.01 |
| 2012/0130598 | A1 | * | 5/2012 | Hukkeri | G01S 7/4815 701/49 |

(Continued)

FOREIGN PATENT DOCUMENTS

JP 2009103529 A 5/2009

OTHER PUBLICATIONS

Andi "How Does a Smartphone Camera Autofocus?", pp. 1-4, retrieved Apr. 26, 2016, retrieved from the Internet https://www.westfloridacomponents.com/blog/how-does-a-smartphone-camera-autofocus/.

(Continued)

*Primary Examiner* — Luke D Ratcliffe
(74) *Attorney, Agent, or Firm* — Cantor Colburn LLP

(57) ABSTRACT

An array lidar system on a platform and a method of operating an array lidar system on a platform including a plurality of illuminators in an array transmitting through a lens includes establishing an initial arrangement of the plurality of illuminators among each other and an initial arrangement of the plurality of illuminators relative to the lens to define an initial field of view of the array lidar system. The method also includes controllably changing the initial field of view to a second field of view.

10 Claims, 7 Drawing Sheets

(56) References Cited

U.S. PATENT DOCUMENTS

2013/0211672 A1    8/2013  Roehder
2014/0071431 A1*  3/2014  Last ........................ G01S 17/89
                                                                356/4.03

OTHER PUBLICATIONS

Mishra et al., "Optofluidic lens with tunable focal length and asphericity", Scientific Reports, pp. 1-4, retrieved Apr. 26, 2016, retrieved from the Internet http://www.nature.com/articles/srep06378.

N.A., "Tunable Optics", pp. 1-11, retrieved Apr. 26, 2016, retrieved from the Internet http://www.vision-systems.com/articles/print/volume-15/issue-7/Features/Tunable_Optics.html.

New Scale Technologies "Phone Camera Applications", pp. 1-2, retrieved Apr. 26, 2016, retrieved from the Internet http://www.newscaletech.com/applications/phone-cameras.php.

Wikipedia, "Piezoelectricity", pp. 1-12, retrieved Apr. 26, 2016, retrieved from the Internet https://en.wikipedia.org/wiki/Piezoelectricity.

Chinese Office Action for CN Application No. 201610299816.8, dated Mar. 13, 2018, pp. 1-10.

\* cited by examiner

ARRAY LIDAR WITH CONTROLLABLE FIELD OF VIEW

CROSS-REFERENCE TO RELATED APPLICATION

This application is a Non-Provisional of U.S. Provisional Application No. 62/158,288 filed May 7, 2015, the disclosure of which is incorporated herein by reference in its entirety.

FIELD OF THE INVENTION

The subject invention relates to an array lidar with controllable field of view.

BACKGROUND

Lidar, which may be referred to as light radar or laser array light detection and ranging, refers generally to transmitting light at an object and receiving and processing a resulting reflection. An array of illuminators (e.g., lasers, light emitting diodes (LEDs)) may be used in an array lidar system to obtain reflections from a wider field of view than is possible with a single illuminator. Generally, the illuminators of an array lidar system are placed in a static arrangement and a lens is used to spread the beams from the illuminators across a field of view. In many applications, an adjustment to the field of view may be beneficial. Accordingly, it is desirable to provide an array lidar system with a controllable field of view.

SUMMARY OF THE INVENTION

According to an exemplary embodiment, a method of operating an array lidar system on a platform including a plurality of illuminators in an array transmitting through a lens includes establishing an initial arrangement of the plurality of illuminators among each other and an initial arrangement of the plurality of illuminators relative to the lens to define an initial field of view of the array lidar system; and controllably changing the initial field of view to a second field of view.

According to another exemplary embodiment, an array lidar system on a platform includes a plurality of illuminators arranged in an array and configured to transmit through a lens, an initial arrangement of the plurality of illuminators among each other and an initial arrangement of the plurality of illuminators relative to the lens defining an initial field of view of the array lidar system; and a processing system configured to change the initial field of view to a second field of view.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

As noted above, lidar systems are used for detection and ranging. Lidar systems have diverse applications in areas such as landslide investigations, archaeology, oil and gas exploration, meteorology, and navigation (e.g., obstacle detection) in automotive applications. As noted above, a conventional array lidar system includes a static arrangement of illuminators. The lens used to spread the transmitted light from the illuminators across a field of view is unchanging. As a result, while the view may change because the entire array lidar system moves (e.g., when the array lidar system is in a vehicle), the dimensions associated with the view (the field of view) remains static. Embodiments of the systems and methods detailed herein relate to controlling a field of view of an array lidar system such that the field of view is variable. The arrangement of the illuminators among themselves, their relative arrangement to the lens, and the lens itself may be controlled to control the field of view. The control may be based on information from an auxiliary sensor, for example. In the exemplary case of an array lidar system in a vehicle, the field of view control may facilitate various adjustments such as, for example, to account for road elevation (e.g., when driving uphill or downhill), for beam steering when driving around curves, and for maintaining the laser beams parallel to the road surface even when the vehicle is pitched up or down (e.g., during hard braking). A modification of the field of view may result in a corresponding change in the receiving lens that receives the reflections. While lasers are discussed herein as exemplary illuminators for explanatory purposes, the discussion below applies to any known illuminators used in array lidar systems.

Figure 1:
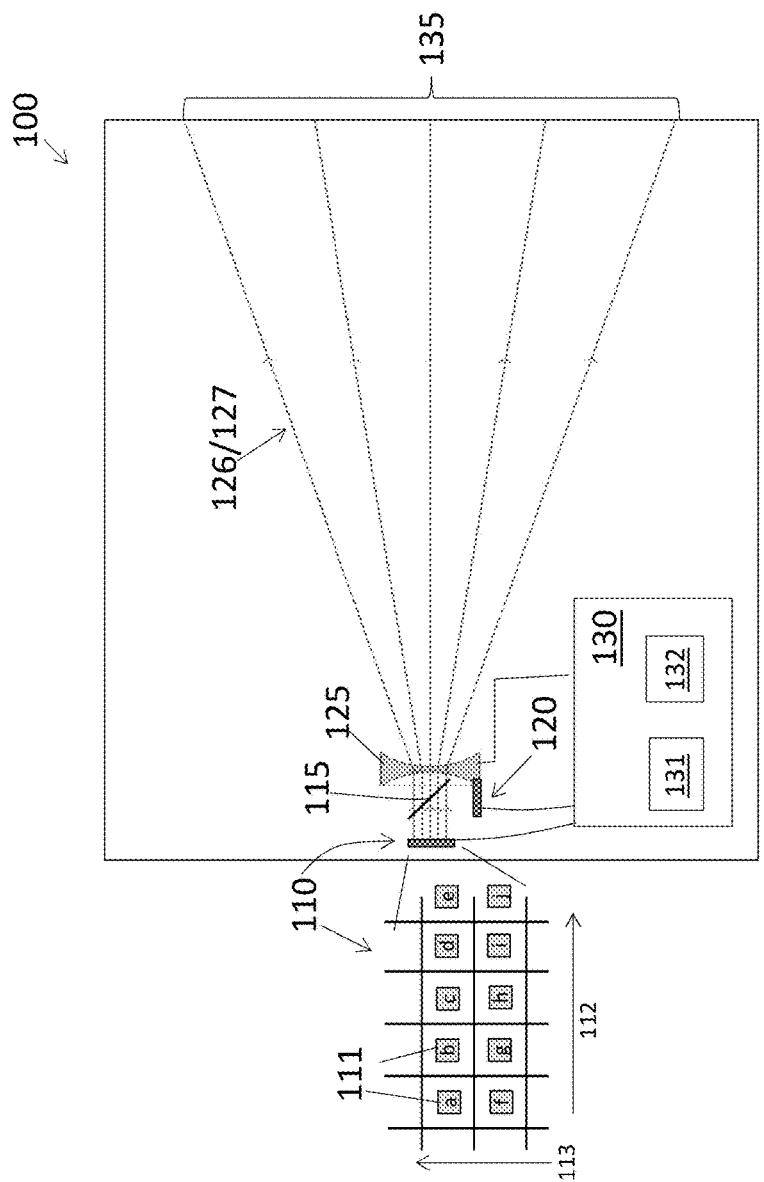
FIG. 1 is a block diagram of an exemplary array lidar system according to embodiments.

FIG. 1 is a block diagram of an exemplary array lidar system 100 according to embodiments. The array lidar 110 refers to an arrangement of two or more lasers 111 in an array such that their transmissions make up a field of view 135. The exemplary array lidar system 110 shown in FIG. 1 includes two rows of five lasers 111-a through 111-e and 111-f through 111-j. The perspective top-down view illustrating the transmission from the array lidar 110 shows five laser beams 126 resulting from one row of lasers 111. The exemplary array lidar system 100 shown in FIG. 1 includes a semi-permeable mirror 115 that focuses light from each laser 111 of the array lidar 110 through a lens 125. The lens 125 disperses the laser beam transmitted by each of the lasers 111 of the array lidar 110 across the field of view 135. An optical detector array 120 receives reflections 127 resulting from the transmissions of the array lidar 110. A controller or processing system 130 may include one or more processors 131 and one or more memory devices 132, along with other known components, in order to control transmission by each of the lasers 111 of the array lidar 110 as well as processing of received reflections by the optical detector array 120. In alternate embodiments, the processing of received reflections may be carried out by another processing system that is in communication with the processing system 130 that controls the array lidar 110. As illustrated in FIG. 1, the array lidar 110 may be used to scan the field of view 135 in both azimuth 112 and elevation 113. Further, each laser 111 gives a range to a target in the field of view 135. Thus, the array lidar 110 provides a three-dimensional image in which each reflection resulting from each pulse emission by a laser 111 may be considered a pixel in the image. The embodiments detailed herein relate to controlling the array lidar 110 or the lens 125 to control the scan of the field of view 135 (the pixels obtained in each image). Exemplary changes in the field of view 135 are discussed with reference to FIGS. 2-6, and exemplary mechanisms to control the field of view 135 are discussed with reference to FIG. 7.

Figure 2:
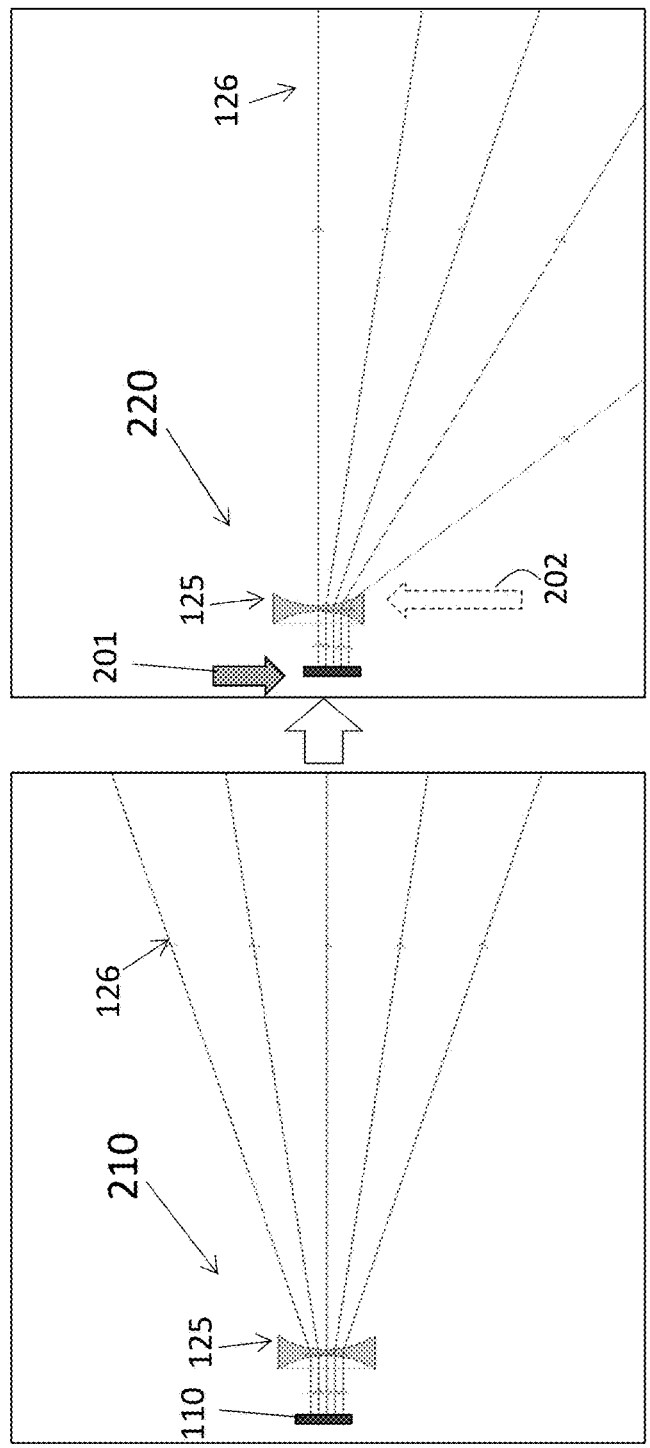
FIG. 2 illustrates a change in the position of the array lidar relative to the lens according to an exemplary embodiment.

FIG. 2 illustrates a change in the position of the array lidar 110 relative to the lens 125 according to an exemplary embodiment. According to arrangement 210, the array lidar 110 is centered on the lens 125 (i.e., the center lasers 111-*c* and 111-*h* (as detailed in FIG. 1) of the array lidar 110 transmits through the center of the lens 125). As a result, the laser beams 126 through the lens 125 are centered relative to the lens 125, as shown on the left side of FIG. 2. According to arrangement 220, the array lidar 110 is shifted relative to the lens 125 such that lasers 111-*e* and 111-*j* (as detailed in FIG. 1) on one end of the array lidar 110 transmit through the center of the lens 125. As a result, the laser beams 126 passing through the lens 125 are focused to one side, as shown on the right side of FIG. 2. That is, based on the exemplary lidar array 110 shown in FIG. 1, lasers 111-*e* and 111-*j* transmit through the center of the lens 125 according to arrangement 220. As indicated by the arrow 201, the change in relative position between the array lidar 110 and lens 125 may be achieved by shifting the position of the array lidar 110. According to an alternate embodiment, as indicated by arrow 202, the change in relative position between the array lidar 110 and lens 125 may be achieved, additionally or alternatively, by shifting the position of the lens 125.

Figure 3:
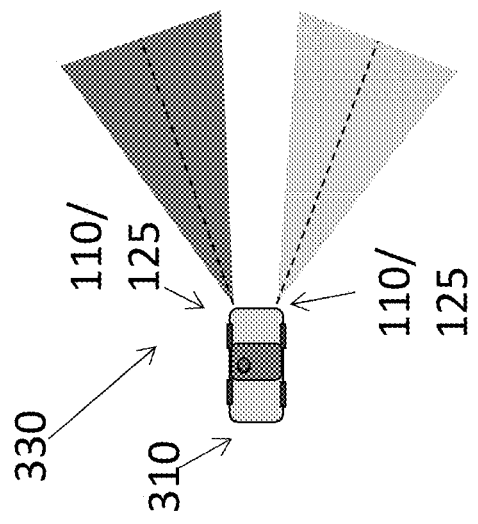
FIG. 3 shows the different arrangements of the array lidar relative to the lens, according to an embodiment, in an exemplary vehicle application.
Figure 3:
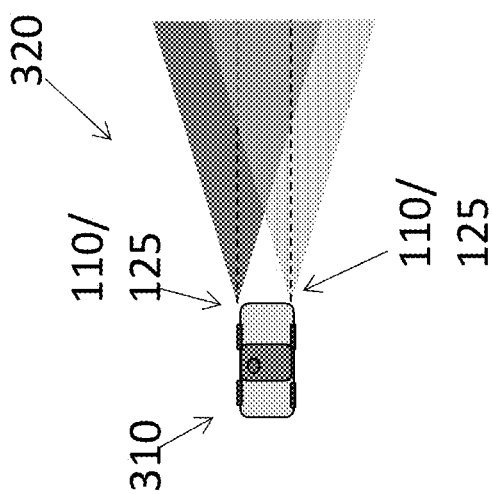

FIG. 3 shows two different configurations 320, 330 of the array lidar 110 relative to the lens 125, according to an embodiment, in an exemplary vehicle 310. The terms arrangement and configuration are both used herein to refer to the spacing among lasers 111 and relative alignment of lasers 111 with the lens 125. The array lidar system 100 may be part of a collision avoidance system of the vehicle 310, for example. The exemplary vehicle 310 includes two array lidars 110 with associated lenses 125. Other components of the array lidar system 100 (e.g., optical detector array 120, processing system 130) may be common to both array lidars 110 or may be separate for each array lidar 110. According to configuration 320, the array lidars 110 detect targets directly in front of the vehicle 310, as shown on the left side of FIG. 3. This configuration, akin to arrangement 210 (FIG. 2) may be preferable when the vehicle 310 is traveling on a highway, for example. This is because the higher speed of the vehicle 310 or other factors, such as guardrails or other obstructions that lessen the likelihood of objects approaching from the side of the vehicle 310, suggest that collision avoidance should be focused directly in front of the vehicle 310. According to the configuration 330, the array lidars 110 detect targets on each side of the vehicle 310, as shown on the right side of FIG. 3. This configuration 330 involves a shift in each array lidar 110 (akin to the arrangement 220 (FIG. 2)) but in opposite directions. That is, according to the exemplary array lidar 110 shown in FIG. 1, one of the array lidars 110 is shifted (or the corresponding lens 125 is shifted) such that lasers 111-*a* and 111-*f* transmit through the center of the lens 125 (the array lidar 110 shown at the top of the right side of FIG. 3), and the other of the array lidars 110 is shifted such that lasers 111-*e* and 111-*j* transmit through the center of the lens 125 (the array lidar 110 shown at the bottom of the right side of FIG. 3). This configuration 330 may be preferable when the vehicle 310 is traveling in an urban or rural setting in which objects (e.g., other cars, animals) may approach from the side.

Conditions that may determine which of the configurations 320, 330 is used may include vehicle speed or consistency of speed (i.e., maintaining speed within a specified range over a specified time). Such conditions may be detected by the vehicle 310 controller and indicated to the processing system 130 of the array lidar systems 100, for example. While FIG. 3 illustrates just two exemplary configurations 320, 330 of the array lidars 110, other combinations of shifts and additional array lidar 110 are also contemplated. For example, under some conditions, both array lidars 110 shown for the vehicle 310 in FIG. 3 may be shifted to focus on the same side of the vehicle 310 rather than each of the array lidars 110 being shifted to focus on opposite sides of the vehicle 310, as shown for configuration 330. That is, both array lidars 110 may be shifted as shown in FIG. 2. One exemplary condition under which such a shift may be preferable is during parking, such that the curb being approached by the vehicle 310 may be the focus of both array lidars 110. Another exemplary condition is when a hazard is detected on one side of the road. The hazard may be detected by one of the array lidars 110 of the vehicle 310 or by another sensor of the vehicle (e.g., radar, camera). Yet another exemplary condition when both array lidars 110 may be shifted to focus on the same side of the vehicle 310 is during bad weather. The array lidars 110 may be used to track one edge of the road because the center of the road is not visible.

Figure 4:
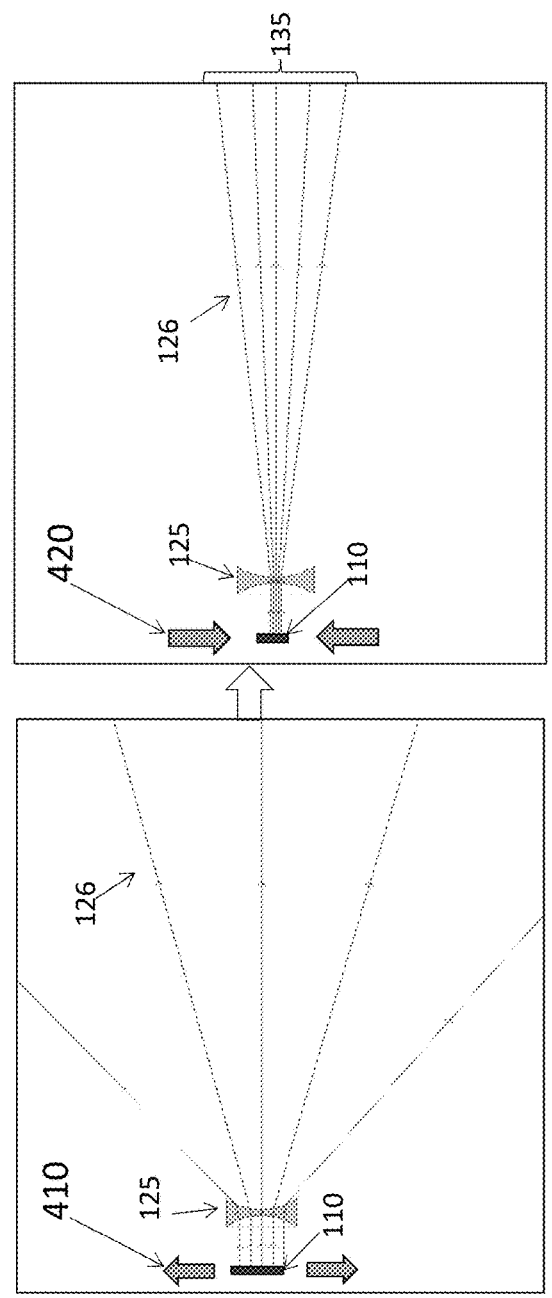
FIG. 4 illustrates a change in the distance between lasers of the array lidar according to an exemplary embodiment.

FIG. 4 illustrates a change in the distance between lasers 111 of the array lidar 110 according to an exemplary embodiment. According to arrangement 410, the lasers 111 of the array lidar 110 are spaced such that they transmit across most of the lens 125. As a result, the laser beams 126 fan out in front of and to the side of the array lidar 110. According to arrangement 420, the lasers 111 of the array lidar 110 are narrowly spaced such that they transmit through a narrow region of the lens 125. As shown in FIG. 4, this narrow region of the lens 125 is a central region of the lens 125. As a result, the laser beams 126 are focused in a relatively narrow field of view 135 in front of the array lidar 110.

Figure 5:
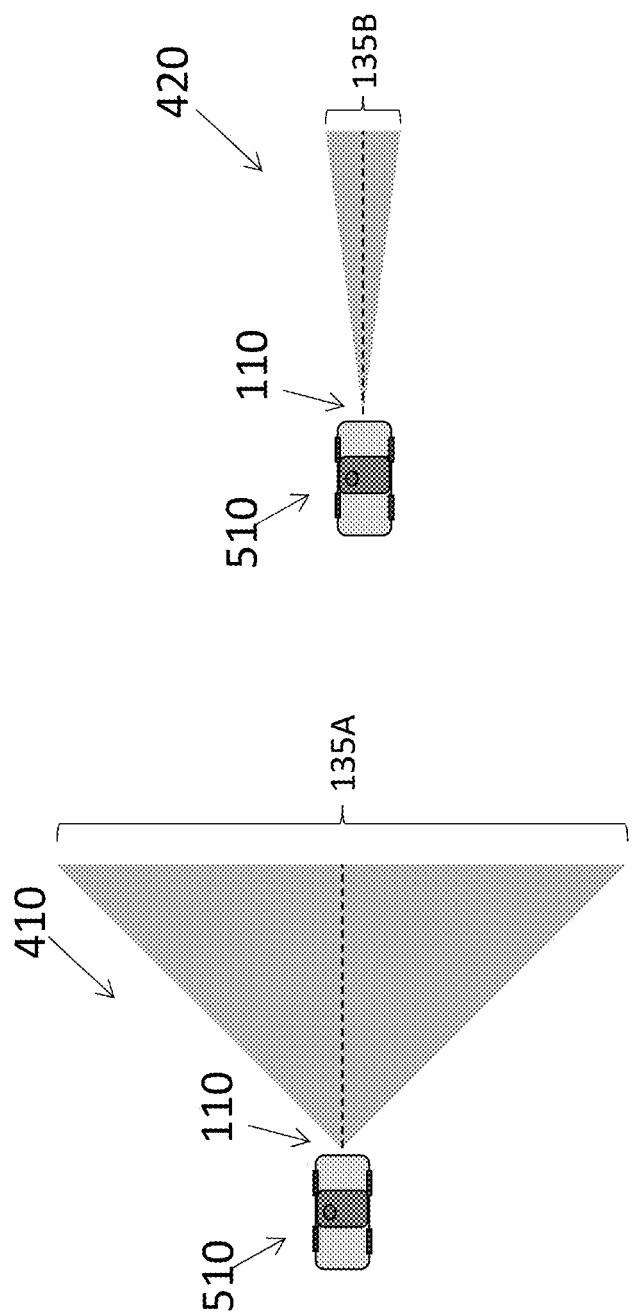
FIG. 5 shows the different arrangements of the array lidar spacing, according to an embodiment, in an exemplary vehicle application.

FIG. 5 illustrates the different arrangements 410, 420 of the spacing of the array lidar 110, according to an embodiment, in an exemplary vehicle application. The array lidar system 100 may be part of a collision avoidance system of the vehicle 510, for example. The exemplary vehicle 510 includes an array lidar 110 and the other components of the array lidar system 100. According to the arrangement 410, the spacing of the lasers 111 of the array lidar 110 is such that a relatively wide field of view 135A results. This arrangement may be preferable at low speed. According to the arrangement 420, the spacing of the lasers 111 of the array lidar 110 is such that a relatively narrow field of view 135B results. This arrangement may be preferable at high speed. Thus, a vehicle 510 controller may trigger the processing system 130 of the array lidar system 100 to change the spacing of the lasers 111 among the array lidar 110 based on vehicle 510 speed.

Figure 6:
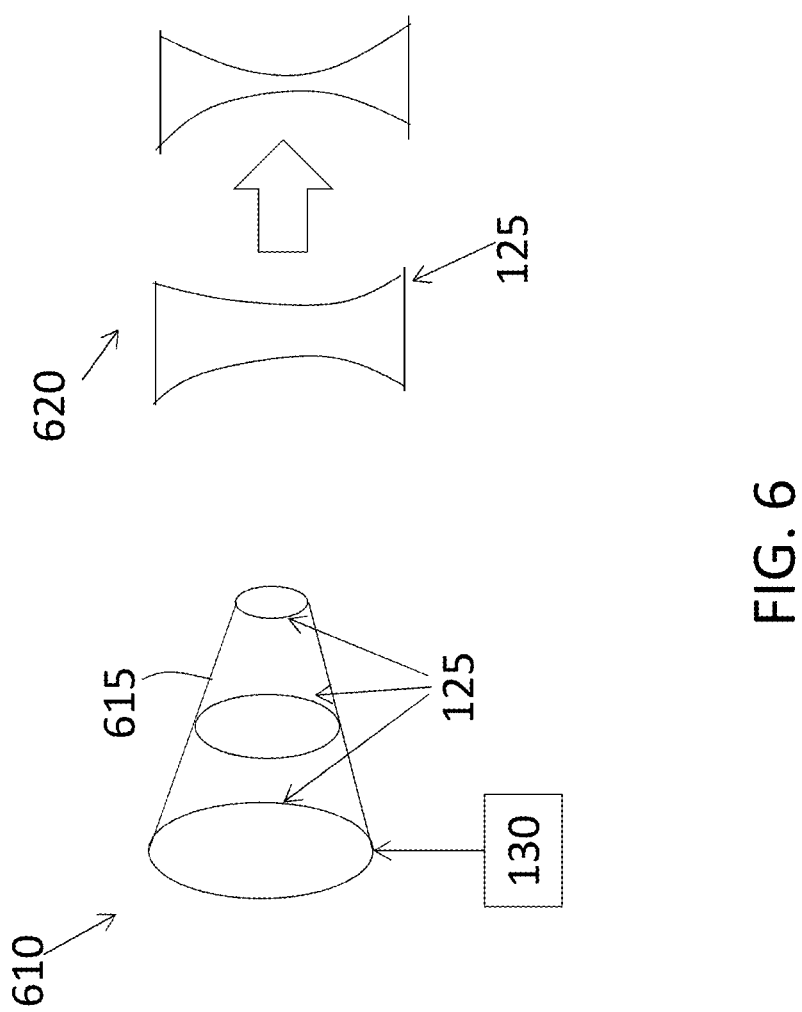
FIG. 6 shows different arrangements of the lens according to exemplary embodiments.

The exemplary changes in the field of view 135 that are shown in FIGS. 2 and 4 result from shifting the array lidar 110 or changing the spacing between lasers 111 of the array lidar 110, as discussed above. Additionally or alternately, the lens 125 shape may be changed to affect similar changes in the field of view 135. FIG. 6 illustrates different configurations of the lens 125 according to exemplary embodiments. Moving the lens 125, like moving the array lidar 110 (as shown in FIG. 2, for example), is one way in which the field of view 135 may be changed in addition to, or instead of, controlling the array lidar 110 according to embodiments. According to one embodiment shown as configuration 610, the lens 125 field of view 135 may be changed by the processing system 130 by arranging the lens 125 like a zoom lens, with multiple lenses 125 within a lens barrel 615. The lenses 125 may be moved closer together or further apart to change the field of view 135. According to still other embodiments, the shape of the lens 125 may be changed. As shown in configuration 620, for example, the curvature of the lens 125 may be changed based on the application of a mechanical or an electrical force controlled by the processing system 130. When the lens 125 is an optofluidic lens, an electric field may be applied based on control by the processing system 130 to change the shape of the lens 125.

Figure 7:
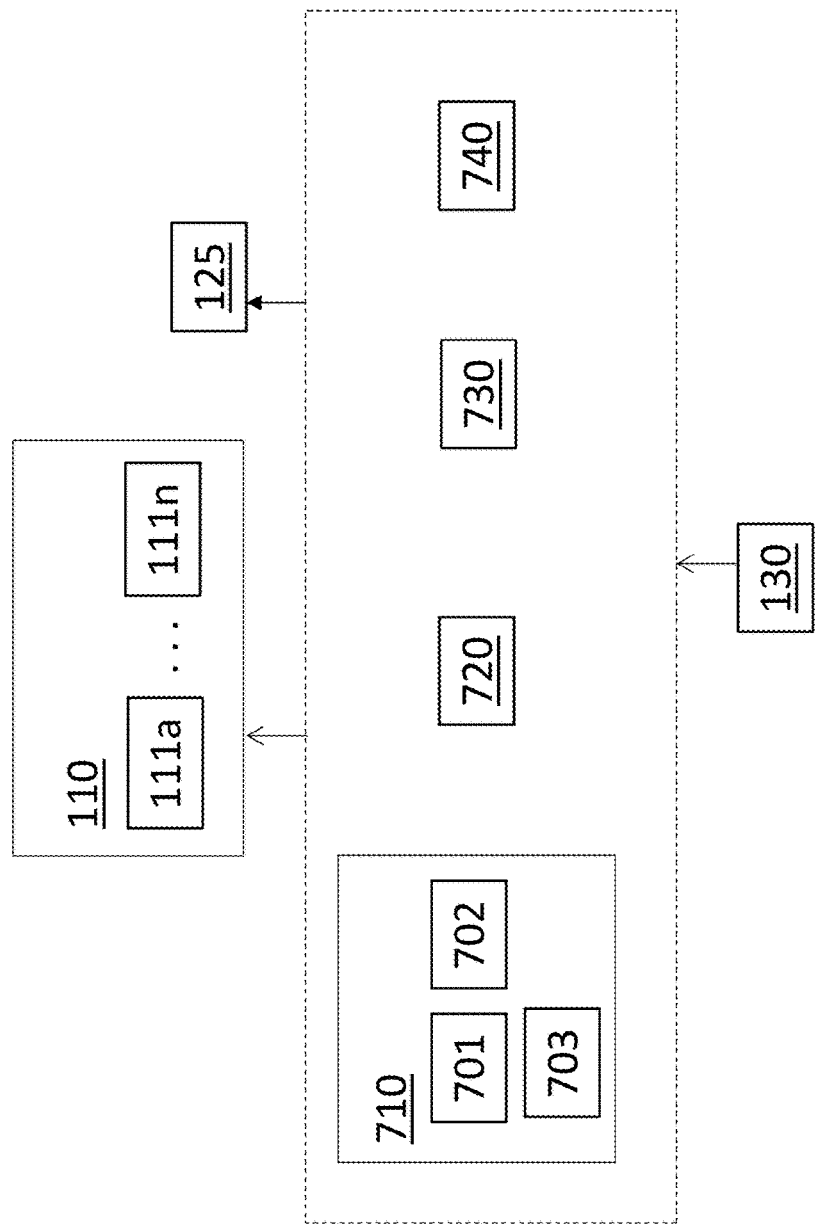
FIG. 7 shows exemplary mechanisms to control the field of view by controlling the arrangement of the array lidar or lens according to embodiments.

FIG. 7 illustrates exemplary mechanisms to control the field of view by controlling the arrangement of the array lidar 110 or lens 125 according to embodiments. The exemplary mechanisms discussed above for changing the shape of the lens 125 are well-known and are not repeated again. A simple mechanism by which the entire array lidar 110 or lens 125 may be moved, as shown in FIG. 2, for example, is by using a linear actuator such as a voice coil motor (VCM) 710. As is known, a VCM 710 includes a coil 701 which, when electricity is passed through it (based on control by the processing system 130), produces a magnetic field. The magnetic field reacts with a permanent magnet 702 to repel or attract the coil 701, thereby moving the coil 701 along an axis. Springs 703 attached to the coil 701 help to bring the coil 701 back to its rest position after the electricity stops flowing in the coil 701. Because the VCM 710 is a known device, the VCM 710 is only generally shown in FIG. 7. The arrangement shown in FIG. 7 does not reflect, for example, that the coil 701 may be coupled with the array lidar 110 or the lens 125 and the permanent magnet 702 is not housed with the coil 701 but, instead, is located to direct the coil 701 and, consequently, the array lidar 110 or the lens 125 along an axis. Two or more VCM 710 may be used to individually control the position of lasers 111 within the array lidar 110. The linear actuation described above with reference to the VCM 710 may instead be achieved by a microelectromechanical system (MEMS) 720. The MEMS 720 has similarities to the operation and restoration described for the VCM 710 but uses an electrostatic charge rather than electromagnetism and, thus, uses less power than the VCM 710. In alternate embodiments, two or more MEMS 720 may be used on lasers 111 or a subset of lasers 111 of the array lidar 110. Because of the smaller size of the MEMS 720, individual lasers 111 may by actuated more easily by respective MEMS 720 to change the spacing among them as shown in FIG. 4, for example.

A piezoelectric actuator 730 based on lead zirconate titanate (PZT) may also be used to generate mechanical stress based on applying current. There may be two or more piezoelectric actuators 730, like the MEMS 720, such that the entire array lidar 110 or lens 125 may be shifted (as in FIG. 2, for example) or individual lasers 111 may be shifted (as in FIG. 4, for example). The piezoelectric actuator 730 may be part of the support structure of the array lidar 110 and/or the lens 125. As such, mechanical stress affected by controlling the piezoelectric actuator 730 may not only move but also compress the spacing among components (as shown in FIG. 4, for example). Yet another exemplary mechanism for controlling the field of view 135 by controlling the relative placement of the lasers 111 within the array lidar 110 or the relative placement of the array lidar 110 with the lens 125 is through shape memory alloys (SMAs) 740. SMAs 740 may be deformed through the application of heat (a temperature rise above a threshold level) and return to their original shape when the temperature drops below the threshold. Exemplary SMAs 740 may be copper-based or nickel-titanium (NiTi) based. Because the shape of the SMAs 740 changes, the array lidar 110 or the lens 125 may be disposed on a SMA-based support (a flexible structure) or individual lasers 111 may be disposed on SMAs 740. Both the array lidar 110 and the lens 125 may be disposed on a flexible support of SMA 740 such that the application of heat changes the shape of the flexible support and, consequently, the relative position of the array lidar 110 and lens 125. Alternately, based on control of the temperature via the processing system 130, the shape of the SMAs 740 and, thus, the position of the lasers 111 or array lidar 110 may be controlled. As noted with reference to the VCM 710, FIG. 7 does not show the specific arrangements or configurations (e.g., array lidar 110 or lens 125 disposed on the SMA 740) but generally shows the coupling between components of the array lidar system 100 because the SMAs 740 are known. While the VCM 710, MEMS 720, piezoelectric actuator 730, and SMAs 740 are exemplary mechanisms by which to achieve the control according to embodiments discussed herein, the examples are not intended to be limited. Any known actuators and linear guide mechanisms (e.g., ultra-thin autofocus modules used in phone cameras) may be utilized to implement the control discussed herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of operating an array lidar system on a platform comprising a plurality of illuminators in an array transmitting through a lens, the method comprising:

establishing an initial arrangement of the plurality of illuminators among each other and an initial arrangement of the plurality of illuminators relative to the lens to define an initial field of view of the array lidar system; and controllably changing the initial field of view to a second field of view, wherein the controllably changing the initial field of view includes changing a distance among the plurality of illuminators within the array, and the changing the distance among the plurality of illuminators includes applying a current to one or more piezoelectric actuators that are part of a support structure of the plurality of illuminators, activating two or more voice coil motors that control a position of each of the plurality of illuminators, or controlling a temperature increase of one or more shape memory alloys that are part of a support structure of the plurality of illuminators to deform the one or more shape memory alloys and move the one or more of the plurality of illuminators.

2. The method according to claim 1, further comprising receiving information from an auxiliary sensor, wherein the controllably changing the initial field of view is based on the information.

3. The method according to claim 1, further comprising processing reflections from the plurality of illuminators from the initial field of view, wherein the controllably changing the initial field of view is based on a result of the processing.

4. An array lidar system on a platform, comprising:
a plurality of illuminators arranged in an array and configured to transmit through a lens, an initial arrangement of the plurality of illuminators among each other and an initial arrangement of the plurality of illuminators relative to the lens defining an initial field of view of the array lidar system;
a processing system configured to change the initial field of view to a second field of view based on changing a distance among the plurality of illuminators within the array; and
one or more piezoelectric actuators that are part of the platform, wherein applying a current to the one or more piezoelectric actuators changes the distance among the plurality of illuminators, two or more voice coil motors that control a position of each of the plurality of illuminators, or one or more shape memory alloys that are part of the platform, wherein controlling a temperature increase of the one or more shape memory alloys deforms the one or more shape memory alloys and moves one or more of the plurality of illuminators.

5. The system according to claim 4, wherein the processing system receives information from an auxiliary sensor and changes the initial field of view based on the information.

6. The system according to claim 4, wherein the processing system processes reflections resulting from the plurality of illuminators transmitting in the initial field of view and changes the initial field of view based on a result of the processing.

7. The system according to claim 4, wherein the platform is a vehicle.

8. An array lidar system on a platform, comprising:
a plurality of lenses;
a plurality of illuminators arranged in an array and configured to transmit through the plurality of lenses, an initial arrangement of the plurality of illuminators relative to the plurality of lenses defining an initial field of view of the array lidar system;
a processing system configured to change the initial field of view to a second field of view based on changing a distance among the plurality of lenses; and
one or more piezoelectric actuators that are part of the platform, wherein applying a current to the one or more piezoelectric actuators changes the distance among the plurality of illuminators, two or more voice coil motors that control a position of each of the plurality of illuminators, or one or more shape memory alloys that are part of the platform, wherein controlling a temperature increase of the one or more shape memory alloys deforms the one or more shape memory alloys and moves one or more of the plurality of illuminators.

9. The system according to claim 8, wherein the processing system processes reflections resulting from the plurality of illuminators transmitting in the initial field of view and changes the initial field of view based on a result of the processing.

10. The system according to claim 8, wherein the platform is a vehicle.

* * * * *